United States Patent

[11] 3,588,184

| | | |
|---|---|---|
| [72] | Inventor | William B. Jeffrey<br>Irwin, Pa. |
| [21] | Appl. No. | 835,537 |
| [22] | Filed | June 23, 1969 |
| [45] | Patented | June 28, 1971 |
| [73] | Assignee | Westinghouse Air Brake Company<br>Wilmerding, Pa. |

[54] LOCOMOTIVE BRAKE CONTROL SYSTEM SUITED FOR REMOTE MULTIPLE UNIT OPERATION
8 Claims, 2 Drawing Figs.

[52] U.S. Cl. .................................................. 303/20,
105/61
[51] Int. Cl. ...................................................... B60t 13/68
[50] Field of Search .......................................... 105/61;
303/3, 20

[56] References Cited
UNITED STATES PATENTS
3,374,035  3/1968  Howard ........................ 303/20
3,384,032  5/1968  Ruff ............................. 105/61

*Primary Examiner*—Duane A. Reger
*Attorneys*—Adelbert A. Steinmiller and Ralph W. McIntire, Jr.

ABSTRACT: Brake control apparatus for the lead locomotive of a multiple unit locomotive control system wherein the brake valve on the lead locomotive is manually operable conventionally to control application and release of the brakes on the forward portion of the train from the lead locomotive and also to effect corresponding control (via radio-transmitted signals initiated by manual operation of the brake valve on the lead locomotive) of the brakes on the remaining portion of the train from the brake valve on a slave locomotive remotely located in the train. A differential-pressure-operated master controller switch device operated in correspondence to the manual operation of the engineer's automatic brake valve on the lead locomotive establishes suitable control circuitry for radio transmission of appropriate brake control signals from the lead to the slave locomotive so as to cause a variation of the pressure in the equalizing reservoir pressure on the slave locomotive, whereby initiating an application or a release of the brakes on that portion of the train coupled to the slave locomotive concurrently with that initiated on that portion of the train coupled to the lead locomotive. This master controller switch device is operated by the difference in fluid pressure present on the opposite sides of a movable abutment to not only control circuitry for radio transmission of appropriate brake control signals from the lead locomotive but also to control circuitry to a solenoid-operated valve which is operative to release fluid under pressure from one side of the abutment to atmosphere at a controlled or restricted rate independently of the release of fluid under pressure from the opposite side of this abutment to atmosphere at a faster rate simultaneously with the release of fluid under pressure from an equalizing reservoir on the lead locomotive in response to manual operation of the automatic brake valve on this locomotive.

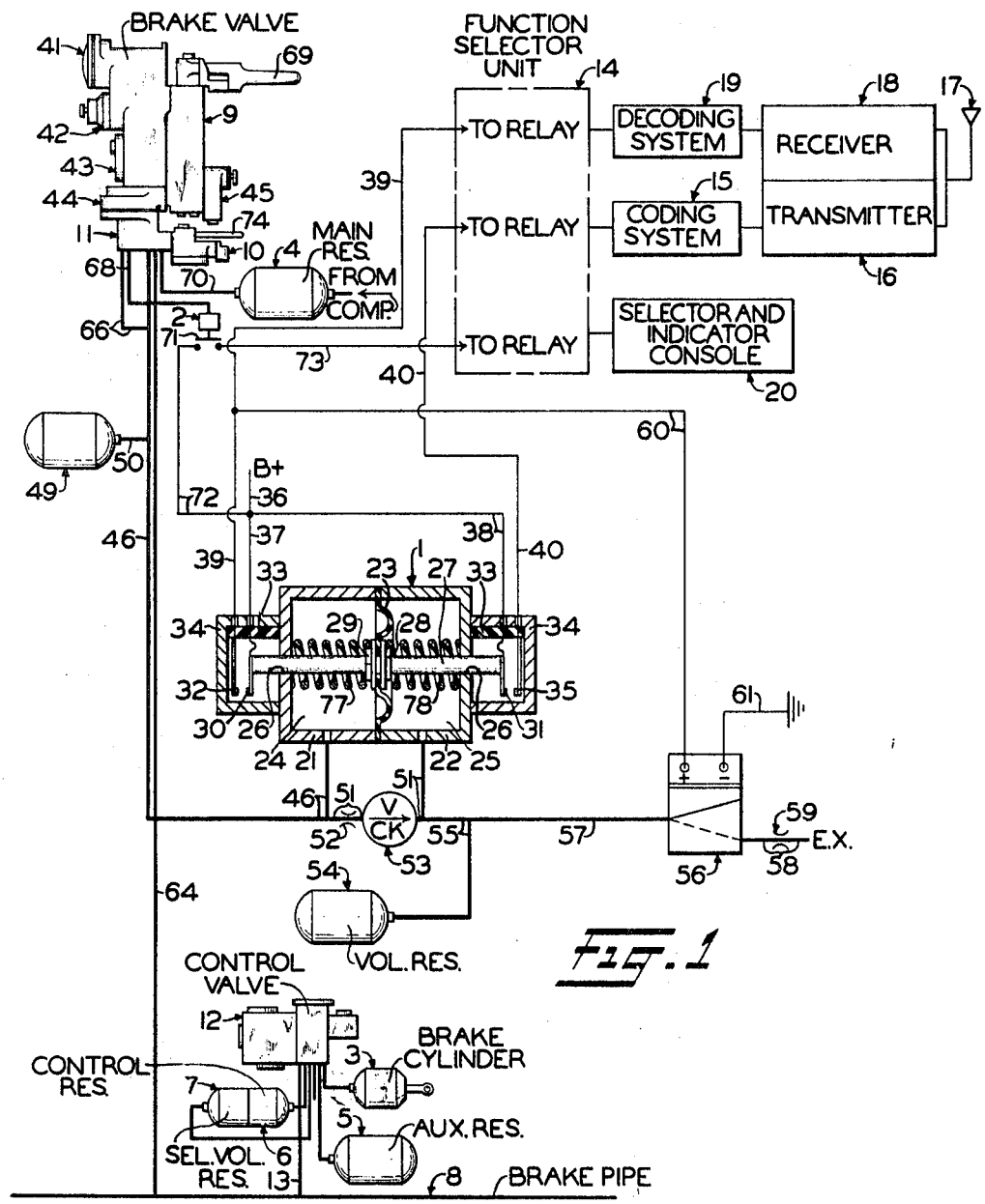

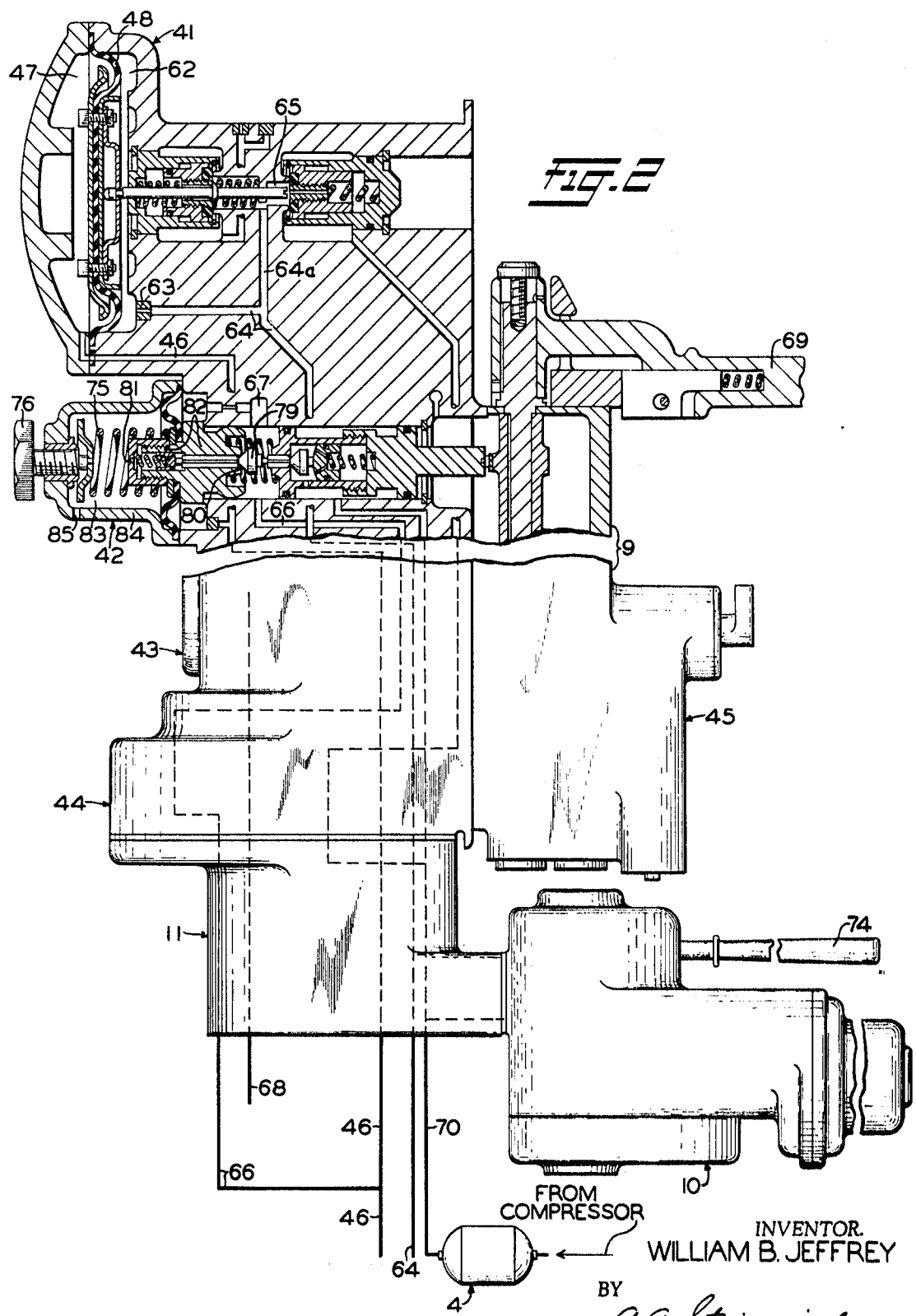

3,588,184

LOCOMOTIVE BRAKE CONTROL SYSTEM SUITED FOR REMOTE MULTIPLE UNIT OPERATION

BACKGROUND OF THE INVENTION

There are presently in use on some American railroads so-called RMU (remote multiple unit) brake control systems capable of effecting, via radio-communicated signals, simultaneous operation of brake controls on a slave locomotive located intermediate the length of a train by operation of the brake controls on the lead locomotive. In one such brake control system, the lead locomotive is provided, in addition to the usual engineer's brake valve, with a manually operated pushbutton type brake control console the manual operation of which simultaneously effects electropneumatic control of pressure in an equalizing reservoir and the brake pipe on the lead locomotive and also, via radio-communicated signals, control of pressure in an equalizing reservoir and the brake pipe on the slave locomotive whereby operation of the brake equipment on those cars located between the slave locomotive and the end of the train occurs substantially simultaneously with operation of the brake equipment on those cars located intermediate the lead and slave locomotive. The additional control equipment to insure that a locomotive is adaptable for use as the lead locomotive in RMU operation represents not only additional equipment cost but additional difficulties in servicing and maintaining the equipment.

Accordingly, it is the purpose of this invention to provide a locomotive control equipment suitable for use on the lead locomotive in RMU operation without the additional separate control equipment including a manually operated pushbutton-type brake control console.

SUMMARY OF THE INVENTION

According to the present invention, a locomotive brake control equipment suited for RMU operation is provided, in which the conventional engineer's automatic brake valve is employed for RMU operation, that is, for control of the brakes on the lead locomotive and on the slave locomotive in the same train, without the addition of a separate pushbutton-type brake control console. This is made possible by the provision of a diaphragm-operated master controller switch device operable by the difference in fluid pressure present on the opposite sides of the diaphragm, as controlled by the manual operation of the handle of the engineer's automatic brake valve to its various brake control positions in which this brake valve functions in its normal manner to control the pressure in the equalizing reservoir on the lead locomotive for brake control purposes, to effect, via radio-communicated signals initiated by operation thereof, similar variation of the pressure in the equalizing reservoir on the slave locomotive, to cause corresponding simultaneous brake control on that portion of the train coupled to the slave locomotive. Operation of this switch device also controls circuitry to a solenoid-operated valve which, when energized, effects the release of fluid under pressure from one side of the diaphragm to atmosphere at a restricted rate independently of the release of fluid under pressure from the opposite side of this diaphragm to atmosphere at a faster rate simultaneously with the release of fluid under pressure from an equalizing reservoir on the lead locomotive in response to manual operation of the automatic brake valve on this locomotive. By thus effecting the release of fluid under pressure from the opposite sides of the diaphragm to atmosphere at different rates, closure of the circuitry controlling the transmission of the radio-communicated signals to the slave locomotive is assured so long as a reduction of pressure in the equalizing reservoir on the lead locomotive continues.

In the accompanying drawings:

FIG. 1 is a diagrammatic view of a locomotive brake control equipment embodying the invention when this locomotive is used as the lead locomotive in RMU operation.

FIG. 2 is an enlarged view partly in section of the engineer's brake valve shown in FIG. 1.

As shown in FIG. 1 of the drawing, the conventional control equipment heretofore provided on a locomotive when it is used as the lead locomotive in remote multiple unit operation is modified by the inclusion of a differential-pressure-operated master controller switch device and a fluid-pressure-operated switch 2, and the elimination of the heretofore known and used manually operable brake control console which embodied a plurality of pushbutton type of switches that were manually operated to effect brake applications and brake releases on the plurality of locomotives and cars comprising the train, it being understood that operation of the brake equipment on the slave locomotive and those cars comprising the portion of the train coupled to the slave locomotive is effect via radio-transmitted signals.

The brake control equipment constituting the present invention further comprises, for pneumatically controlling the brakes on the lead locomotive, a brake cylinder 3, a plurality of reservoirs including a main reservoir 4, an auxiliary reservoir 5, a control reservoir 6 which is combined with a selector volume reservoir 7 into a two-compartment reservoir, a brake pipe 8 that extends from end to end of the locomotive and at one end is coupled to the train brake pipe by the usual hose and hose couplings, an engineer's automatic brake valve 9 operative to control the pressure in the brake pipe 8, an independent brake valve 10 that is secured to a pipe bracket 11 of the automatic brake valve 9 by any suitable means (not shown) for controlling the brakes on the locomotives independently of the brakes on the cars in the train, and a fluid pressure brake control valve 12 that is connected by a branch pipe 13 to the brake pipe 8.

In order to effect operation of the brake equipment on a slave locomotive via radio signals transmitted thereto from the lead locomotive, the brake control equipment embodying the present invention further includes a function selector unit 14 having a plurality of electrical relays, the pickup circuits of two of which are controlled by the differential-pressure-operated master controller switch device 1. The pickup circuit of a third one of these relays is closed in response to the supply of fluid under pressure to the fluid-pressure-operated switch 2. This brake control equipment also includes a coding system 15 for receiving the output information of the function selector unit 14 and preparing this information for transmittal to a remote locomotive via a radio transmitter 16 having an antenna 17. Furthermore, this brake equipment on the lead locomotive further comprises a radio receiver 18 for receiving via antenna 17 information in the form of radio signals transmitted from the remote locomotive regarding the status of this locomotive or these locomotives, and converting these radio signals to electrical inputs which are fed to a decoding system 19 that in turn transmits the information regarding the remote locomotive to the function selector unit 14 which coordinates this information and furnishes it to a selector and indicator console 20 for display.

As shown in detail in FIG. 1, the differential-pressure-operated master controller switch device 1 comprises a sectionalized casing constituting a pair of cuplike casing sections 21 and 22 between which is clamped the outer periphery of a diaphragm 23 by any suitable means (not shown).

The diaphragm 23 cooperates with the casing sections 21 and 22 to form within the switch device 1 and on the respective opposite sides of the diaphragm 23 a pair of chambers 24 and 25.

The end of each of the cuplike casing sections 21 and 22 is provided with a central bore 26 which at one end opens into the respective chambers 24 and 25. Slidably mounted in the bore 26 is a stem 27 that extends through the central opening provided in the diaphragm 23. That portion of the stem 27 disposed within the chamber 25 is provided with a collar 28 that on its left-hand side forms a shoulder against which rest the inner periphery of the diaphragm 23 which is clamped against this collar by a nut 29 that has screw-threaded engagement with screw threads formed on a portion of the stem 27 that is adjacent the left-hand side of this collar 28.

Secured by any suitable means to the respective opposite ends of the stem 27 are a pair of movable contacts 30 and 31. Upon movement of the stem 27 in the direction of the lefthand, the movable contact 30 is moved into circuit-closing contact with a stationary contact 32 that is carried by a plate 33 which is constructed of any suitable insulating material that, for example, may be rubber. The plate 33 is bonded or otherwise secured to a switchbox 34 in which the contacts 30 and 32 are disposed and which is anchored to the casing section 21 by any suitable means (not shown).

Likewise, upon movement of the stem 27 in the direction of the right hand, the movable contact 31 is moved into circuit-closing contact with a second stationary contact 35 that is carried by a second insulating plate 33 identical to the first and secured in like manner to a second switchbox 34 in which the contacts 31 and 35 are disposed and which is anchored to the casing 22 by any suitable means (not shown).

The movable contacts 30 and 31 of the switch device 1 are respectively connected to a positive power supply wire 36 by wires 37 and 38 each of which has a loop therein adjacent the corresponding movable contact and extends through the respective insulating plate 33 and an opening provided in one side of the switch boxes 34 to which these plates 33 are secured.

The stationary contact 32 of the switch device 1 is connected by a wire 39 extending through the corresponding plate 33 and switchbox 34 to an automatic brake application relay (not shown) in the function selector unit 14 to cause energization or pickup of this relay upon the movable contact 30 being shifted into circuit-closing contact with stationary contact 32. Whenever this relay is thus picked up, transmission of the brake application command signal to the slave locomotive or locomotives is made via radio-transmitted signals effected by operation of the coding system 15, transmitter 16 and antenna 17.

The stationary contact 35 of the switch device 1 is connected by a wire 40 extending through the corresponding plate 33 and switchbox 34 to an automatic brake release relay (not shown) in the function selector unit 14 to cause energization or pickup of this relay. Whenever this relay is thus picked up, transmission of the automatic brake release command signal to the slave locomotive is made via radio-transmitted signals effected by the coding system 15, transmitter 16 and antenna 17. When this automatic brake release command signal is received on the slave locomotive it effects energization of a solenoid coil of a brake-valve-charging cutout spool valve which is thereupon moved to a position to release fluid under pressure from a pressure chamber of a brake pipe cutoff valve of the automatic brake valve 9 on the slave locomotive. Upon this release of fluid under pressure from the brake pipe cutoff valve on the slave locomotive, the automatic brake valve 9 on this locomotive is rendered effective to supply fluid under pressure to the train brake pipe. Assuming that the brake valve 9 on the lead locomotive is in its release position, the supply of fluid under pressure to the train brake pipe is now simultaneously effected by the operation of the automatic brake valve 9 on the two locomotives in the train, in a manner hereinafter more fully described, until the train brake pipe is charged to the normal pressure carried therein which may be, for example, 70 pounds per square inch.

The automatic brake valve 9 and the independent brake valve 10 are both secured to the pipe bracket 11 and thus constitute 26-C type of self-lapping brake valve manufactured by Westinghouse Air Brake Division of Westinghouse Air Brake Company, a subsidiary of American Standard, Inc.

The automatic brake valve 9, as shown in FIG. 2 of the drawings, comprises a relay valve 41, a self-lapping regulating or control valve 42, a suppression valve 43, an equalizing reservoir cutoff valve 44, a manually positionable selector valve 45 for selectively conditioning the brake valve 9 for effecting either direct release operation of the brake control valve on each car in a train of cars hauled by a locomotive provided with this automatic brake valve 9, if each car is provided with a direct-release-type brake control valve, or graduated application and graduated release operation of the brake control valve on each car, if each car is provided with a graduated release-type control valve, for cutting out control of brake pipe pressure by the brake valve 9 for multiple unit or trailing (pusher) unit operation, or for conducting a brake pipe leakage test, a vent valve, an emergency valve, and a brake pipe cutoff valve, the latter three not being shown in FIG. 2 since they form no part of the present invention.

The construction and operation of the independent brake valve 10 is identical with that of an independent brake valve which has been disclosed in a copending application assigned to the assignee of the present application. Accordingly, a detailed showing and description of operation has been omitted respectively from the drawings and specification of the present application.

As shown in the drawings, opening into the chamber 24 in switch device 1 is one end of a pipe 46 the opposite end of which is connected to a corresponding passageway in the automatic brake valve 9 which passageway extends through the pipe bracket 11 and sectionalized casing of the brake valve 9 and opens into a chamber 47 (FIG. 2) at the left-hand side of a diaphragm 48 of the hereinbefore-mentioned relay valve 41.

An equalizing reservoir 49 (FIG. 1) is connected to the pipe 46 by a pipe 50. Also connected to the pipe 46 intermediate the ends thereof is one end of a pipe 51 that has disposed in series therein a choke 52 and a check valve 53 which opens in the direction to provide for flow of fluid under pressure to the chamber 25 in switch device 1 into which opens the other end of the pipe 51. A volume reservoir 54 is connected to the pipe 51 on the delivery side of the check valve 53 by a pipe 55 the purpose of this volume reservoir 54 being to provide stability for the switch device 1.

As shown in FIG. 1 of the drawings, in order for a magnet or solenoid-operated release valve 56 on the lead locomotive to effect the release of fluid under pressure from the chamber 25 in the switch device 1 and from the volume reservoir 54 to atmosphere at a restricted rate independently of the release of fluid under pressure from the chamber 24 in this switch device 1 and from the equalizing the reservoir 49 to atmosphere at an unrestricted rate via the control valve 42 of the automatic brake valve 9 in a manner hereinafter described, an inlet port of this valve 56 is connected by a pipe 57 to the above-mentioned pipe 55 intermediate the ends thereof. One delivery port of this valve 56 is open to atmosphere via a pipe 58 having a choke 59 disposed therein, and a second delivery port is closed by a plug (not shown).

Also, as shown in FIG. 1, a positive terminal of the solenoid of the release valve 56 is connected by a wire 60 to the hereinbefore-mentioned wire 39 that is supplied with electrical power whenever the contacts 30 and 32 of the switch device 1 are closed, as hereinbefore stated. A negative terminal of this solenoid of the release valve 56 is connected by a wire 61 to ground.

As shown in FIG. w of the drawings, a chamber 62 in the relay valve 41 and at the right-hand side of the diaphragm 48 is connected to the hereinbefore-mentioned brake pipe 8 (FIG. 1) via a choke 63 and a passageway and corresponding pipe 64. A branch 64a (FIG. 2) of the passageway 64 opens into the delivery chamber 65 of the relay valve 41. Consequently, the right-hand side of the diaphragm 48 is subject to brake pipe pressure in the chamber 62 and the left-hand side of this diaphragm is subject to equalizing reservoir pressure in the chamber 47. Accordingly, the relay valve 41 is operative in response to variations of pressure effected in the equalizing reservoir 49 by operation of the control valve 42 to effect a corresponding variation of pressure in the brake pipe 8.

As shown in FIG. 1, connected to the pipe 46 intermediate the pipe 50 and the pipe bracket 11 is one end of a pipe 66 that at its opposite end is connected to a corresponding passageway in the pipe bracket 11. This passageway extends through the hereinbefore-mentioned equalizing reservoir cutoff valve 44, while it is in its open position, and opens into a delivery chamber 67 (FIG. 2) in the control valve 42 of automatic brake valve 9.

From the foregoing, it is apparent that fluid under pressure flows from the delivery chamber 67 of the control valve 42 to the chamber 24 (FIG. 1) in the switch device 1 at an unrestricted rate via passageway and pipe 66 and pipe 46. Fluid under pressure also flows at an unrestricted rate from the pipe and passageway 46 to the chamber 47 in the relay valve 41 and to the equalizing reservoir 49 via pipe 50.

Furthermore, it is apparent that fluid under pressure flows from the delivery chamber 67 to the chamber 25 in the switch device 1 at a restricted rate determined by the size of the choke 52 via pipe and passageway 66, pipes 46 and 51, choke 52 and check valve 53. Fluid under pressure also flows at a restricted rate from the delivery port of the check valve 53 to the volume reservoir 54 via pipes 51 and 55.

As shown in the drawings, one end of a pipe 68 is connected to the hereinbefore-mentioned fluid-pressure-operated switch 2 and the opposite end of this pipe is connected to a corresponding passageway in the automatic brake valve 9 which passageway leads to an emergency valve (not shown) in this brake valve 9. It will be understood that while a handle 69 of the automatic brake valve 9 occupies all of its positions except its emergency position the emergency valve occupies a corresponding position in which it establishes a communication between the pipe and corresponding passageway 68 and atmosphere so that fluid under pressure is completely vented from the switch 2. It will be further understood that, upon manual movement of the handle 69 to its emergency position, the emergency valve is moved to a corresponding emergency position in which it establishes a communication through which fluid under pressure may flow from the main reservoir 4 to the switch 2 via a pipe and corresponding passageway 70, a peripheral annular groove on the emergency valve, and the passageway and corresponding pipe 68 to effect operation of switch 2 to its closed position. In the closed position of normally open contact 71 of switch 2, a circuit is established between a wire 72 that is connected to the hereinbefore-mentioned power supply wire 36 and a wire 73 that is connected to an emergency brake application relay (not shown) in the function selector unit 14 to cause energization of this relay. Whenever this relay is thus picked up, transmission of the emergency brake application command signal to the slave locomotive is made via radio-transmitted signals effected by the coding system 15, transmitter 16 and antenna 17.

The brake control valve 12 may be of any suitable type, such as, for example, a 26-F type of brake control valve manufactured by the aforesaid Westinghouse Air Brake Division of Westinghouse Air Brake Company.

The function selector unit 14 may be such as, for example, an A-3-A type of selector unit manufactured by the aforesaid company.

The coding system 15, the transmitter 16, the receiver 18 and the decoding system 19 are all embodied in a single coding cabinet and constitute the No. 580 solid-state code system manufactured by the Signal & Communications Division of Westinghouse Air Brake Company.

The antenna 17 may be such as, for example, a 6AN-1 antenna manufactured by Antenna Specialists Company. This antenna 17 is connected to the transmitter 16 and receiver 18 by a suitable cable.

The selector and indicator console 20 may be such as, for example, an A-2 type of selector and indicator console manufactured by the aforesaid Westinghouse Air Brake Division of Westinghouse Air Brake Company.

The main reservoir 4 is charged with fluid under pressure by the usual fluid compressor (not shown) carried on the locomotive.

OPERATION

Let it be supposed that a locomotive is provided with the brake control apparatus shown in the drawings and that this locomotive is the lead locomotive in an RMU train consist. Let it be further supposed that a locomotive is coupled between two cars in the train which may be at a distance from the lead locomotive, and that the brake control equipment on this slave locomotive includes, with the exception of the differential-pressure-operated master controller switch device 1, the same brake control equipment as shown in the drawings with the addition of a brake control center which may be, such as, for example, an A-410 brake control center manufactured by the aforesaid Westinghouse Air Brake Division. It will be understood that this brake control equipment on the slave locomotive is operated in response to radio-transmitted signals from the lead locomotive to control the pressure in the equalizing reservoir on this slave locomotive and correspondingly the pressure in that portion of the train brake pipe extending in both directions from this locomotive.

After a train is made up, the lead and slave locomotive equipments must be conditioned as follows:
1. The controls on the lead locomotive set for lead operation.
2. The selector valve 45 of the brake valve 9 on both the lead and the slave locomotive set in freight position.
3. The power supply switch of the selector and indicator console 20 shown in the drawings is set in power ON position, it being understood that a fluid pressure brake switch on this console 20 is set in an IN position, subsequent to the setting of this power supply switch in its power ON position.
4. The controls on the slave locomotive set for trailing operation, except for the fluid pressure brakes which must be set for lead operation.
5. The handle 69 of the automatic brake valve 9 and the handle 74 of the independent brake valve 10 on the slave locomotive must be moved to their bake release position.
6. The function selector unit 14 on the remote locomotive set in power ON position.

In order to initially effect charging of the brake pipe 8 on the lead locomotive and the train brake pipe that extends back through each car in the train and the brake equipment on each of these cars, the engineer on the lead locomotive will manually move the handle 69 of the automatic brake valve 9 on this locomotive to its brake release positions.

Also, it may be assumed that a regulating spring 75 (FIG. 2) of the self-lapping control valve 42 of the automatic brake valve 9 on both the lead and the remote locomotive has been manually adjusted by means of an adjusting screw 76 so that this control valve 42 will provide in its delivery chamber 67 a desired normal pressure, which, for example, may be 70 pounds per square inch.

It will be understood that while the selector valve 45 of the automatic brake valve 9 on each locomotive occupies its freight position, the supply of fluid under pressure from the main reservoir 4 on the respective locomotive to the corresponding equalizing reservoir cutoff valve 44 will be effected only while the handle 69 occupies its release position to cause opening of the valve. Consequently, fluid under pressure will flow from the delivery chamber 67 of the control valve 42 of the automatic brake valve 9 on the lead locomotive to the corresponding equalizing reservoir 49 via passageway and corresponding pipe 66 and pipes 46 and 50. Fluid under pressure thus supplied to the pipe 46 also flows to the chamber 47 in the relay valve 41 via passageway 46 whereupon this relay valve is operated to effect the supply of fluid under pressure from the main reservoir 4 on the lead locomotive to that portion of the train brake pipe connected to this locomotive.

Some of the fluid under pressure supplied to the pipe 46 from the passageway and pipe 66 flows to the chamber 24 (FIG. 1) in the switch device 1. Fluid under pressure thus supplied to this chamber 24 is effective on the left-hand side of the corresponding diaphragm 23 to deflect it in the direction of the right hand and thereby move the stem 27 in this same direction until the movable contact 31 carried on the right-hand end of this stem is moved into circuit-closing contact with the corresponding stationary contact 35 it being noted that the loop in the wire 38 provides for this movement without breaking the wire 38. In this circuit-closed position of these contacts 31 and 35 a circuit is established between the wire 38 that is connected to the power supply wire 36 and the wire 40 that is connected, as aforesaid, to the automatic brake release relay in the function selector unit 14 to cause energization or pickup of this relay. As hereinbefore explained, when this automatic brake release relay is picked up, automatic brake release command signals are transmitted from the lead locomotive to the slave locomotive to cause the automatic brake valve 9 on this locomotive to effect the supply of fluid under pressure to that portion of the train brake pipe connected thereto. Consequently, the supply of fluid under pressure to the train brake pipe is now simultaneously effected by operation of the automatic brake valve 9 on the two locomotives in the train until the train brake pipe is charged to the normal pressure carried therein.

It will be noted from FIG. 1 of the drawings that fluid under pressure supplied to the equalizing reservoir 49 and chamber 24 via pipe 46 also flows to the chamber 25 in the switch device 1 via pipe 51, choke 52 and check valve 53 at a rate determined by the size of the choke 52. Fluid under pressure also flows to the volume reservoir 54 via the pipe 55. Consequently, the chamber 25 and volume reservoir 54 are charged with fluid under pressure at a slower rate than the chamber 24. Accordingly, it is apparent that the contacts 31 and 35 remain in their closed position until the pressure in the chamber 25 is increased to substantially that in the chamber 24 which corresponds to the setting of the control valve 42 (FIG. 2). Upon substantial equalization of pressure in the chambers 24 and 25, a pair of springs 77 and 78, disposed on the opposite sides of the diaphragm 23 and in surrounding relation to the stem 27, is rendered effective to shift the diaphragm 23 and stem 27 to the position shown in FIG. 1 in which the movable contact 31 is moved out of circuit-closing contact with the stationary contact 35 thus opening the circuit to the automatic brake release relay in the function selector unit 14 to cause deenergization of this relay.

Since the brake control valve 12 is connected to the brake pipe 8 by the branch pipe 13, fluid under pressure will flow from the brake pipe 8 to the brake control valve 12 to effect operation thereof to its release position in which it causes fluid under pressure to be completely released from the brake cylinder 3 thereby releasing the brakes on the lead locomotive, and in which it causes the auxiliary reservoir 5, control reservoir 6 and selector volume reservoir 7 to be charged to the pressure carried in the brake pipe 8. Likewise, the brake control valves on the slave locomotive and all the cars in the train will operate in response to charging of the train brake pipe to the normal pressure carried therein, as determined by the setting of the control valve 42 of the automatic brake valve 9 on the two locomotives in the train, which normal pressure may be, for example, as hereinbefore stated, 70 pounds per square inch, to effect a complete release of the brakes on these locomotives and all the cars in the train.

The engineer on the lead locomotive may now start the train on its journey to the next terminal or station.

Let it be supposed that after the train has traveled some distance from its starting point, it must descend a grade that requires that the engineer on the lead locomotive effect a brake application on the entire train. Accordingly, the engineer will move the handle 69 of the automatic brake valve 9 on the lead locomotive out of its release position and to a position in its application zone corresponding to the degree of reduction of pressure desired in the train brake pipe. Therefore, the self-lapping control valve 42 of the automatic brake valve 9 will now be operated in the usual manner in which an exhaust valve 79 (FIG. 2), that is disposed in the chamber 67, is unseated from its valve seat 80. When valve 79 is thus unseated, fluid under pressure flows from the chamber 24 (FIG. 1) in the switch device 1, the equalizing reservoir 49 and chamber 47 (FIG. 2) in the relay valve 41 to atmosphere at an unrestricted rate via pipe and passageway 46, pipe 50, pipe and passageway 66, chamber 67, past now unseated exhaust valve 79, a port 81 in an exhaust valve seat member 82, a chamber 83 in a control valve cover 84, and a port 85 in this cover.

This release of fluid under pressure from the chamber 24 in the switch device 1 to atmosphere by the control valve 42 causes the fluid under pressure trapped in the chamber 25 and the volume reservoir 54 by the check valve 53 to quickly establish a pressure differential on the opposite sides of the diaphragm 23 which is effective to deflect this diaphragm in the direction of the left hand and thereby move the stem 27 in the same direction until the movable contact 30 secured to the left-hand end of this stem is moved into circuit-closing contact with the stationary contact 32. In this circuit-closed position of these contacts 32 and 30 the hereinbefore-described circuit to the automatic brake application relay in the function selector unit 14 is supplied with electric power from the power supply wire 36 to cause energization or pickup of this relay. When this relay is thus picked up, automatic brake application command signals are transmitted from the lead to the slave locomotive or locomotives via radio-transmitted signals effected by operation of the coding system 15, transmitter 16 and antenna 17. It will be understood that the brake control equipment on the slave locomotive is operative in response to receiving these signals to effect a reduction of pressure in the equalizing reservoir on this locomotive and a corresponding reduction of pressure in those portions of the train brake pipe connected thereto so long as these radio-transmitted signals are received from the lead locomotive.

As fluid under pressure is released from the chamber 47 in the relay valve 41 of the automatic brake valve 9 on the lead locomotive in the manner described above, this relay valve 41 operates in response thereto to effect a corresponding reduction of pressure in the brake pipe 8 and that portion of the train brake pipe connected thereto. Accordingly, the substantially simultaneous reduction of pressure effected in the several portions of the train brake pipe by the automatic brake valve 9 on the corresponding several locomotives in the train causes a brake application on the two locomotives and all the cars in the train.

It will be noted from FIG. 1 that in the circuit-closed position of contacts 32 and 30 of the switch device 1, the solenoid of the release valve 56 is energized via a circuit that extends from the positive power supply wire 36 to this solenoid via wire 37, contacts 30 and 32 now in their circuit-closing position, wire 39 and wire 60, and thence to ground via wire 61. When the solenoid of the release valve 56 is thus energized, the corresponding plunger moves the two-position valve of release valve 56 against the yielding resistance of a spring (not shown) from a first position to a second position.

When this two-position valve is thus moved to its second position, a communication is established between the pipe 57 and atmosphere via pipe 58 and choke 59 whereupon fluid under pressure will flow from chamber 25 and volume reservoir 54 to atmosphere at a restricted rate via pipes 51, 55 and 57, release valve 56, pipe 58 and choke 59.

It will be apparent that the above-mentioned release of fluid under pressure from the chamber 25 in the switch device 1 at a restricted rate determined by the size of the choke 59 subsequent to the cessation of the release of fluid under pressure from the chamber 24 in this switch device quickly reduces the pressure in the chamber 25 to that in the chamber 24. Upon equalization of pressure in chambers 24 and 25 in switch device 1, springs 77 and 78 are rendered effective to shift the diaphragm 23, stem 28 and movable contact 30 to the position shown in FIG. 1 in which movable contact 30 is no longer in circuit-closing contact with stationary contact 32. The shifting of contact 30 out of circuit-closing contact with contact 32 opens the circuit to the automatic brake application relay in the function selector unit 14 and to the solenoid of the release valve 56 thereby respectively terminating the transmission of automatic brake application signals from the lead locomotive to the slave locomotive and energization of the solenoid of release valve 56. The brake control equipment on this slave locomotive now operates to correspondingly terminate the reduction of pressure in that portion or those portions of the train brake pipe connected to the slave locomotive. Likewise, the release valve 56 on the lead locomotive operates to terminate the venting of fluid under pressure from the chamber 25 and volume reservoir 54 to atmosphere.

It will be understood that upon operation of the control valve 42 of the automatic brake valve 9 on the lead locomotive to its lap position in which fluid under pressure is no longer vented from the chamber 24 in the switch device 1, the equalizing reservoir 49 and the chamber 47 in the relay valve 41 of the brake valve 9, this relay valve likewise is shifted to its lap position to terminate venting of fluid under pressure from that portion of the train brake pipe connected to the brake pipe 8 on the lead locomotive.

The brakes on the entire train can be subsequently released by the engineer on the lead locomotive manually moving the handle 69 of the brake valve 9 on this locomotive out of the position it occupies in its application zone and back to its brake release position. Upon return of the handle 69 to its brake release position, the corresponding control valve 42 (FIG. 2) operates to effect the supply of fluid under pressure to the equalizing reservoir 49 and chamber 47 in relay valve 41 on the lead locomotive whereupon this relay valve operates to effect the supply of fluid under pressure from the main reservoir 4 on this locomotive to that portion of the train brake pipe connected thereto.

Fluid under pressure supplied to the equalizing reservoir 49 by the control valve 42 also flows to the chamber 24 in the switch device 1 via the pipe 46. This supply of fluid under pressure to the chamber 24 causes this switch device 1 to operate in the manner hereinbefore described to cause energization of the automatic brake release relay in the function selector unit 14 and the transmission of automatic brake release command signals to the slave locomotive whereupon fluid under pressure is supplied to that portion of the train brake pipe connected thereto. Accordingly, this substantially simultaneous supply of fluid under pressure to the train brake pipe by the automatic brake valve 9 on the two locomotives in the train until the train brake pipe is charged to the normal pressure carried therein causes a complete release of the brakes on these locomotives and all the cars in the train.

Let it now be supposed that while the brakes on the entire train are released and the train is traveling along the track toward its designation it becomes necessary that the engineer on the lead locomotive effect an emergency brake application.

To effect an emergency brake application on the entire train, the engineer on the lead locomotive will quickly move the handle 69 of the brake valve 9 on this locomotive from its release position to its emergency position to effect a reduction of pressure in the brake pipe 8 and in that portion of the train brake pipe extending from the lead locomotive toward the slave locomotive at a rapid or emergency rate. The control valve 12 on the lead locomotive operates in response to this reduction of pressure in the brake pipe 8 at an emergency rate to effect a corresponding emergency brake application on this locomotive.

When the handle 69 is manually moved by the engineer to its emergency position, the emergency valve of automatic brake valve 9 is moved to a position to establish a communication via which fluid under pressure is supplied from the main reservoir 4 to the pipe 68 which is connected to the switch 2 whereupon the contact 71 of this switch is moved to its closed position. In the closed position of contact 71 it establishes a circuit between the wires 72 and 73 to cause pickup of the hereinbefore-mentioned emergency brake application relay in the function selector unit 14 on the lead locomotive.

As hereinbefore stated, when this emergency relay is thus picked up, transmission of the emergency brake application command signal to the remote locomotive is made via radio-transmitted signals effected by the coding system 15, transmitter 16 and antenna 17 on the lead locomotive. It will be understood that the brake control equipment on the remote locomotive is operative in response to the emergency brake application command signals transmitted thereto from the lead locomotive via radio to effect a reduction of pressure in the equalizing reservoir 49 and brake pipe 8 on the remote locomotive and a corresponding reduction of pressure in the portions of the train brake pipe extending from each end of this remote locomotive at an emergency rate. Accordingly, it will be understood that the brake control valves on the two locomotives and all the cars in the train operate substantially simultaneously in response to a reduction of pressure in the train brake pipe at an emergency rate to effect an emergency brake application on the entire train.

When the train has been brought to a stop and all danger has past, the emergency brake application can be released by the engineer moving the handle 69 of the brake valve 9 on the lead locomotive from its emergency position back to its release position.

I claim:

1. In a multiple locomotive brake control system for a train of cars having a lead locomotive and at least one slave locomotive remotely located therefrom, brake control apparatus for the lead locomotive comprising the combination of:
   a. a normally charged brake pipe, variations of the fluid pressure in which are effective to control brake applications and brake releases on the locomotives and cars in the train,
   b. a normally charged equalizing reservoir,
   c. a brake valve having:
      i. a relay valve which is subject to the opposing pressures in said equalizing reservoir and said brake pipe and is operative by the differential of such pressures to control the pressure in said brake pipe, and
      ii. regulating valve means operative to control the pressure in said equalizing reservoir,
   d. coding and radio signal transmitting means for transmitting command signals from the lead locomotive to a slave locomotive,
wherein the improvement comprises:
   e. a differential-pressure-operated master controller switch device having:
      i. an abutment subject to fluid pressure on opposite sides thereof and movable in opposite directions from a neutral position respectively according to the predominating pressure acting thereon, and
      ii. a pair of normally open switches disposed on opposite sides respectively of said abutment and operative selectively to closed positions upon movement of said abutment out of its neutral position in the direction of the switch in response to said regulating valve effecting, accordingly as said brake valve is selectively manually operated to corresponding ones of a plurality of operating positions, the supply of fluid under pressure to both sides of said abutment simultaneously or the release of fluid under pressure from only one of said sides, said switches correspondingly controlling operation of said coding and radio signal means,
   f. one-way valve means past which fluid under pressure flows to a chamber at one side of said abutment, and
   g. electroresponsive valve means under the control of one of said switches for controlling the release of fluid under pressure from said chamber at the said one side of said abutment to atmosphere.

2. In a multiple locomotive brake control system for a train of cars, the combination as claimed in claim 1, further characterized by volume means communicating directly with said chamber at the said one side of said abutment for increasing the volume of this chamber above the volume of the chamber on the other side of said abutment.

3. In a multiple locomotive brake control system for a train of cars, the combination as claimed in claim 1, further characterized by choke means restricting the supply of fluid under pressure to said chamber at said one side of said abutment.

4. In a multiple locomotive brake control system for a train of cars, the combination as claimed in claim 1, further characterized by choke means for restricting the rate of release of fluid under pressure from said chamber at the said one side of said abutment to atmosphere by operation of said electroresponsive valve means.

5. In a multiple locomotive brake control system for a train of cars, the combination as claimed in claim 1, further characterized by first choke means restricting the supply of fluid under pressure to said chamber at one side of said abutment, and by second choke means for restricting the rate release of fluid under pressure from said chamber at the said one side of said abutment to atmosphere by operation of said electroresponsive valve means.

6. In a multiple locomotive brake control system for a train of cars, the combination as claimed in claim 1, further characterized in that said one switch that controls operation of said electroresponsive valve means also effects operation of said coding and radio signal transmitting means to transmit a brake application command signal to a slave locomotive.

7. In a multiple locomotive brake control system for a train of cars, the combination as claimed in claim 1, further characterized in that said one switch that controls operation of said electroresponsive valve means also, while closed, effects operation of said coding and radio signal transmitting means to transmit a brake application command signal to a slave locomotive, and in that the other switch of said pair of switches, while closed, effects operation of said coding and radio signal transmitting means to transmit a brake release command signal to a slave locomotive.

8. In a multiple locomotive brake control system for a train of cars, the combination as claimed in claim 2, further characterized in that said one-way valve means provides for flow of fluid under pressure from said equalizing reservoir to said volume means and prevents flow of fluid under pressure from said volume means to said equalizing reservoir.